(12) United States Patent
Quijano (10) Patent No.: US 8,500,092 B2
(45) Date of Patent: Aug. 6, 2013

(54) SECONDARY SEAT FOR GAS REGULATOR (75) Inventor: Erik M. Quijano, The Colony, TX (US)

(73) Assignee: Fisher Controls International LLC, Marshalltown, IA (US)

( * ) Notice: Subject to any disclaimer, the term of this patent is extended or adjusted under 35 U.S.C. 154(b) by 892 days.

(21) Appl. No.: 12/105,792

(22) Filed: Apr. 18, 2008

(65) Prior Publication Data
US 2008/0257423 A1 Oct. 23, 2008

Related U.S. Application Data

(60) Provisional application No. 60/913,121, filed on Apr. 20, 2007.

(51) Int. Cl.
*F16K 31/00* (2006.01)

(52) U.S. Cl.
USPC .......................... 251/333; 137/505; 137/613

(58) Field of Classification Search
USPC .................. 251/174, 186, 58, 170, 176, 159, 251/333; 137/505.46, 505.47, 508, 614.11, 137/613, 489, 505, 505.14, 614.14
See application file for complete search history.

(56) References Cited

U.S. PATENT DOCUMENTS

| | | | |
|---|---|---|---|
| 836,258 A | 11/1906 | Hubner et al. | |
| 1,166,027 A | 12/1915 | Weisgerber et al. | |
| 1,262,225 A | 4/1918 | Meyer | |
| 1,918,602 A | 7/1933 | Joyce | |
| 1,973,744 A | 9/1934 | Brown | |
| 2,173,707 A | 9/1939 | Brown | |
| 2,192,327 A | 3/1940 | Palmer | |
| 2,215,419 A | 9/1940 | Cheeseman | |
| 2,263,581 A | 11/1941 | Hughes | |
| 2,315,370 A | 3/1943 | Hughes | |
| 2,522,732 A | 9/1950 | Fairchild | |
| 2,619,983 A | 12/1952 | Roberts | |
| 2,688,980 A | 9/1954 | Pool | |

(Continued)

FOREIGN PATENT DOCUMENTS

| | | |
|---|---|---|
| DE | 37 14 065 A1 | 10/1987 |
| DE | 295 06 395.6 | 6/1995 |

(Continued)

OTHER PUBLICATIONS

Office Action for Chinese Patent Application No. 200880012623.3, dated Dec. 21, 2010.

(Continued)

*Primary Examiner* — John K Fristoe, Jr.
*Assistant Examiner* — Matthew W Jellett
(74) *Attorney, Agent, or Firm* — Marshall, Gerstein & Borun LLP (57) ABSTRACT

A fluid regulating device includes a valve disc and a valve port adapted to provide a secondary seal during an obstructed closing operation, whereby the valve disc directly engages a housing component of the valve port to maximize the integrity of the secondary seal and advantageously reduce the size and complexity of existing valve ports. The valve port comprises a housing and a cartridge slidably disposed in the housing. The valve disc directly engages a primary seat carried by the cartridge during a normal closing operation. During an obstructed closing operation, however, the cartridge is pushed into the housing such that the valve disc directly engages a secondary seat carried by the housing at a location that is downstream of the cartridge.

22 Claims, 7 Drawing Sheets

(56) References Cited

U.S. PATENT DOCUMENTS

| | | | |
|---|---|---|---|
| 2,826,213 A | 3/1958 | Wright | |
| 2,827,069 A | 3/1958 | Peterson | |
| 2,869,575 A * | 1/1959 | Hutchens | 137/251.1 |
| 2,895,501 A | 7/1959 | Irwin | |
| 2,951,494 A | 9/1960 | Holmes | |
| 3,001,545 A | 9/1961 | Ziege | |
| 3,160,169 A | 12/1964 | Peterson | |
| 3,228,417 A | 1/1966 | Schwerter | |
| 3,386,465 A | 6/1968 | Johnson | |
| 3,392,749 A | 7/1968 | Gneiding e al. | |
| 3,420,257 A | 1/1969 | Lansky et al. | |
| 3,425,442 A * | 2/1969 | Cameron et al. | 137/505.15 |
| 3,488,685 A | 1/1970 | Hughes | |
| 3,525,356 A * | 8/1970 | Cameron et al. | 137/505.15 |
| 3,572,372 A | 3/1971 | Moore | |
| 3,580,271 A | 5/1971 | Farrer | |
| 3,599,658 A | 8/1971 | Kruzan et al. | |
| 3,613,725 A * | 10/1971 | Hughes | 137/613 |
| 3,621,867 A | 11/1971 | Johnson | |
| 3,623,506 A | 11/1971 | Bonner et al. | |
| 3,658,082 A | 4/1972 | DiTirro | |
| 3,705,599 A | 12/1972 | Sheward | |
| 3,722,536 A | 3/1973 | Hill et al. | |
| 3,754,570 A | 8/1973 | Hughes et al. | |
| 3,809,108 A * | 5/1974 | Hughes | 137/73 |
| RE28,447 E | 6/1975 | Bonner et al. | |
| 3,892,255 A * | 7/1975 | Johnson | 137/116.5 |
| 3,971,410 A | 7/1976 | St. Clair | |
| 4,019,531 A | 4/1977 | Johnson | |
| 4,067,354 A * | 1/1978 | St. Clair | 137/329.4 |
| 4,067,355 A | 1/1978 | St. Clair | |
| 4,069,839 A * | 1/1978 | Hughes | 137/505.46 |
| 4,129,145 A | 12/1978 | Wynn | |
| 4,176,677 A | 12/1979 | Hughes | |
| 4,195,656 A | 4/1980 | Kanerva et al. | |
| 4,485,843 A | 12/1984 | Wolff | |
| 4,505,292 A * | 3/1985 | Osterode | 137/240 |
| 4,679,592 A | 7/1987 | Lamb | |
| 4,754,778 A | 7/1988 | Duffy et al. | |
| 4,842,013 A | 6/1989 | Rice et al. | |
| 4,889,158 A | 12/1989 | Rice et al. | |
| 4,972,868 A | 11/1990 | Davis et al. | |
| 4,972,871 A | 11/1990 | Rice et al. | |
| 5,007,614 A | 4/1991 | Lockwood, Jr. | |
| 5,176,148 A | 1/1993 | Wiest et al. | |
| 5,697,398 A * | 12/1997 | Gidney et al. | 137/484.8 |
| 5,881,765 A | 3/1999 | Turney et al. | |
| 5,887,853 A | 3/1999 | Holmes et al. | |
| 6,167,905 B1 | 1/2001 | Malloy et al. | |
| 6,321,166 B1 | 11/2001 | Evans et al. | |
| 6,422,260 B2 | 7/2002 | Danowski et al. | |
| 7,537,194 B2 * | 5/2009 | Nagai | 251/77 |
| 2004/0187930 A1 * | 9/2004 | Hawkins et al. | 137/505.47 |
| 2005/0106952 A1 | 5/2005 | Maxwell et al. | |
| 2006/0065307 A1 | 3/2006 | Schmidt et al. | |
| 2008/0031755 A1 | 2/2008 | Pekar | |
| 2008/0257427 A1 | 10/2008 | Zhang et al. | |

FOREIGN PATENT DOCUMENTS

| | | |
|---|---|---|
| EP | 0 277 869 A1 | 8/1988 |
| GB | 0 966 346 A | 8/1964 |
| GB | 1 220 467 A | 1/1971 |
| GB | 2 024 996 | 1/1980 |
| JP | 55-094064 A | 7/1980 |
| JP | 06-004140 A | 1/1994 |
| WO | WO-02/093284 A1 | 11/2002 |

OTHER PUBLICATIONS

Office Action for Chinese Patent Application No. 200880011137.X, dated Dec. 27, 2010.
International Search Report for PCT/US2008/060857, mailed Aug. 1, 2008.
Written Opinion of the International Searching Authority for PCT/US2008/060857, mailed Aug. 1, 2008.
European Examination Report for Application No. 08746296.6, dated May 26, 2011.
First Chinese Office Action for Application No. 200880009704.8, dated May 31, 2011.
First Chinese Office Action for Application No. 200880011778.5, dated Jun. 21, 2011.
Office Action for Gulf Corporation Council Application No. GCC/P/2008/10630, dated Jul. 2, 2011.
Actaris Metering Systems, "B38 Series Commerical & Industrial Regulator, Advanced Metering and Regulation Technology at Work," pp. 1-28 (2002).
Actaris Metering Systems, "CL34 Series Commerical Regulator, Advanced Metering and Regulation Technolos at Work," pp. 1-12 (2001).
Actaris Metering Systems, "Gas Regulation Overview," pp. 1-16 (2004).
Actaris Metering Systems "Regulator Loading Ring Instructions," pp. 1-2 (1996).
Australian Office Action Application No. 2008242690, dated Mar. 10, 2011.
Australian Office Action for Application No. 2008242692, dated Feb. 22, 2011.
Australian Office Action for Application No. 2008242775, dated Nov. 16, 2010.
Australian Office Action or Application No. 2008242777, dated Nov. 29, 2010.
Emerson Process Management, "Y600A Series Pressure Reducing Regulators," Instruction Manual Form 5458, pp. 1-8 (2008).
European Examination Report for Application No. 08746301.4, Jan. 20, 2011.
European Office Action or Application No. 08746287.5-2206, dated Mar. 15, 2010.
European Office Action for Application No. 08746291.7, dated Mar. 15, 2010.
European Office Action for Application No. 08746310.5, dated Mar. 16, 2010.
First Chinese Office Action for Application No. 200880011104.5, dated Apr. 20, 2011.
First Office Action for Chinese Application No. 200880011630.1, dated Feb. 24, 2011.
First Office Action for Chinese Application No. 200880012891.5, dated Apr. 15, 2011.
Fisher-Rosemount, "Type Y600A Series Pressure Reducing Regulators. More Versatile Than Ever Before," pp. 1-2 (1998).
International Preliminary Report on Patentability for Application No. PCT/US2008/060842, dated Oct. 20, 2009.
International Preliminary Report on Patentability for Application No. PCT/US2008/060846, dated Oct. 20, 2009.
International Preliminary Report on Patentability for Application No. PCT/US2008/060857, dated Oct. 20, 2009.
International Preliminary Report on Patentability for Application No. PCT/US2008/060860, dated Oct. 20, 2009.
International Preliminary Report on Patentability for Application No. PCT/US2008/060872, dated Oct. 20, 2009.
International Search Report for Application No. PCT/US2008/060862, dated Aug. 5, 2008.
International Search Report for Application No. PCT/US2008/060842, dated Jul. 29, 2008.
International Search Report for Application No. PCT/US2008/060846, dated Aug. 6, 2008.
International Search Report for Application No. PCT/US2008/060860, dated Aug. 5, 2008.
International Search Report Application No. PCT/US2008/060872, dated Aug. 5, 2008.
Schlumberger Gas, "CL-38 Series Constan Loaded Regulators," Data Sheet, (1997).
Written Opinion for Application No. PCT/US2008/060842, dated Jul. 29, 2008.
Written Opinion for Application No. PCT/US2008/060846, dated Aug. 6, 2008.
Written for Application No. PCT/US2008/060860, dated Aug. 5, 2008.

Written Opinion for Application No. PCT/US2008/060862, dated Aug. 5, 2008.
Written Opinion for Application No. PCT/US2008/060872, dated Aug. 5, 2008.
European Examination Report for Application No. 08746310.5, dated Aug. 8, 2011.
Office Action for Australian Application No. 2008242699, dated Sep. 22, 2011.
Second Chinese Office Action for Application No. 200880011137.X, dated Sep. 1, 2011.
Russian Office Action for Application No. 2009140597/28(057707), dated Mar. 22, 2012.
Office Action for Gulf Cooperation Council Application No. GCC/P/2008/10631, dated Sep. 19, 2011.
Russian Office Action for Application No. 2009139833/28(056527), dated Jan. 23, 2012.
Second Office Action for Chinese Application No. 200880012623.3, dated Nov. 9, 2011.
Extended European Search Report for Application No. 12158736.4, dated May 2, 2012.
Extended European Search Report for Application No. 12160527.3, dated Apr. 30, 2012.
Extended European Search Report for Application No. 12160711.3, dated Apr. 26, 2012.
Office Action for Japanese Application No. 2010-504278, dated Aug. 14, 2012.
Office Action for Japanese Application No. 2010-504288, dated Jul. 31, 2012.
Office Action for Japanese Application No. 2010-504277, dated Jul. 24, 2012.
Office Action for Japanese Application No. 2010-504282, dated Dec. 25, 2012.

* cited by examiner

SECONDARY SEAT FOR GAS REGULATOR

CROSS-REFERENCE TO RELATED APPLICATIONS

The priority benefit of U.S. Provisional Patent Application No. 60/913,121, entitled "Secondary Seat for Gas Regulator," filed Apr. 20, 2007, is claimed and the entire contents thereof are expressly incorporated herein by reference.

FIELD OF THE INVENTION

The present invention relates to gas regulators, and more particularly, to gas regulators having regulator valves with primary and secondary seats for closing the flow of fluid through the regulator.

BACKGROUND

The pressure at which typical gas distribution systems supply gas may vary according to the demands placed on the system, the climate, the source of supply, and/or other factors. However, most end-user facilities equipped with gas appliances such as furnaces, ovens, etc., require the gas to be delivered in accordance with a predetermined pressure, and at or below a maximum capacity of a gas regulator that may be installed in the system. Such gas regulators are implemented into these distribution systems to ensure that the delivered gas meets the requirements of the end-user facilities. Conventional gas regulators generally include a closed-loop control actuator for sensing and controlling the pressure of the delivered gas.

In addition to a closed loop control, some conventional gas regulators include a relief valve. The relief valve is adapted to provide over pressure protection when the regulator or some other component of the fluid distribution system fails, for example. Accordingly, in the event the delivery pressure rises above a predetermined threshold pressure, the relief valve opens to exhaust at least a portion of the gas to the atmosphere, thereby reducing the pressure in the system.

Figure 1:
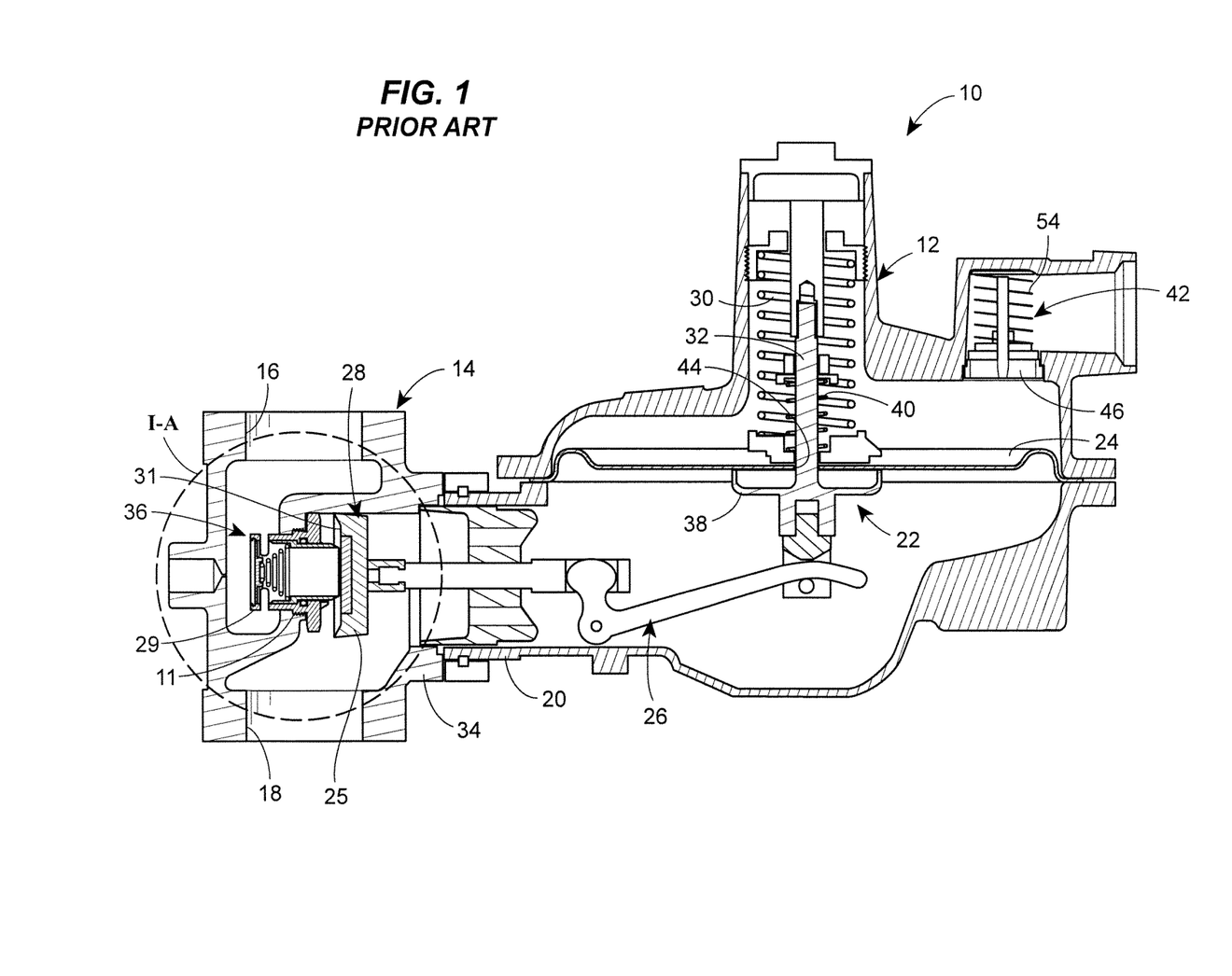
FIG. 1 is a side cross-sectional view of a conventional regulator including a conventional valve port.
Figure 1A:
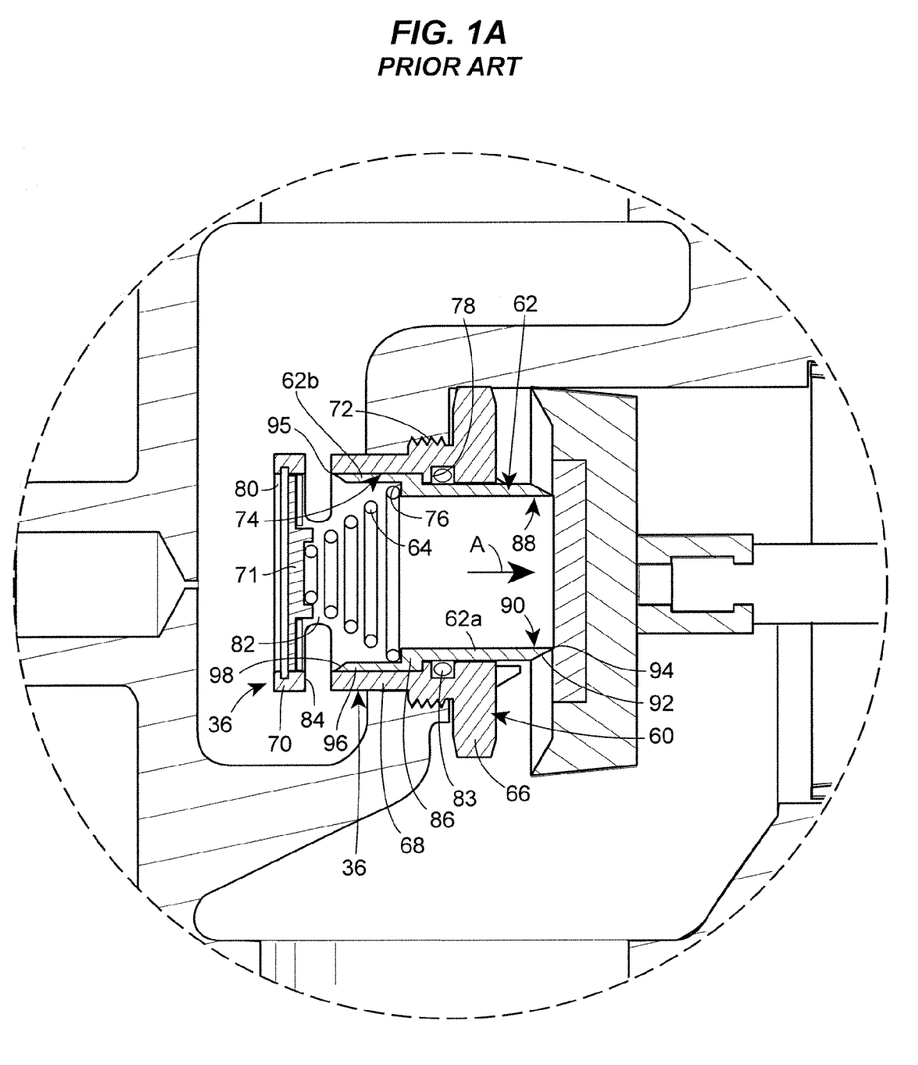
FIG. 1A is a side cross-sectional view of a regulator valve of the regulator of FIG. 1 including the conventional valve port and taken from circle I-A of FIG. 1.

FIGS. 1 and 1A depict one conventional gas regulator 10. The regulator 10 generally comprises an actuator 12 and a regulator valve 14. The regulator valve 14 defines an inlet 16, an outlet 18, and a throat 11. The inlet 16 is for receiving gas from a gas distribution system, for example. The outlet 18 is for delivering gas to an end-user facility such as a factory, a restaurant, an apartment building, etc. having one or more appliances, for example. Additionally, the regulator valve 14 includes a valve port 36 carried by the throat 11 and disposed between the inlet 16 and the outlet 18. Gas must pass through the valve port 36 to travel between the inlet 16 and the outlet 18 of the regulator valve 14.

The actuator 12 is coupled to the regulator valve 14 to ensure that the pressure at the outlet 18 of the regulator valve 14, i.e., the outlet pressure, is in accordance with a desired outlet or control pressure. The actuator 12 is therefore in fluid communication with the regulator valve 14 via a valve mouth 34 and an actuator mouth 20. The actuator 12 includes a control assembly 22 for sensing and regulating the outlet pressure of the regulator valve 14. Specifically, the control assembly 22 includes a diaphragm 24, a piston 32, and a control arm 26 having a valve disc 28. The conventional valve disc 28 includes a generally cylindrical body 25 and a sealing insert 29 fixed to the body 25. The diaphragm 24 senses the outlet pressure of the regulator valve 14. The control assembly 22 further includes a control spring 30 in engagement with a top-side of the diaphragm 24 to offset the sensed outlet pressure. Accordingly, the desired outlet pressure, which may also be referred to as the control pressure, is set by the selection of the control spring 30.

The diaphragm 24 is operably coupled to the control arm 26, and therefore the valve disc 28, via the piston 32, controls the opening of the regulator valve 14 based on the sensed outlet pressure. For example, when an end user operates an appliance, such as a furnace that places a demand on the gas distribution system downstream of the regulator 10, the outlet flow increases, thereby decreasing the outlet pressure. Accordingly, the diaphragm 24 senses this decreased outlet pressure. This allows the control spring 30 to expand and move the piston 32 and the right-side of the control arm 26 downward, relative to the orientation of FIG. 1. This displacement of the control arm 26 moves the valve disc 28 away from the valve port 36 to open the regulator valve 14. So configured, the appliance may draw gas through the valve port 36 toward the outlet 18 of the regulator valve 14, as demand may be required for operation.

FIG. 1A depicts the conventional valve port 36 of the conventional regulator 10. The valve port 36 generally includes a housing 60, a cartridge 62, and a spring 64. The cartridge 62 is slidably disposed within the housing 60 such that the valve port 36 is adapted for providing both a primary seal and a back-up, or secondary, seal, as will be described. The spring 64 biases the cartridge 62 into the position depicted in FIG. 1A, which corresponds to the valve port 36 providing the primary seal.

The housing 60 includes a hollow, generally cylindrical housing having a hexagonal nut portion 66, a body portion 68, and a curtain portion 70. The body portion 68 includes an internal bore 74 defining a step 76 and a ring-shaped recess 78. The ring-shaped recess 78 contains an o-ring 83 for providing a pneumatic seal between the housing 60 and the cartridge 62. The body portion 68 further includes a plurality of external threads 72 for being threadably coupled into the regulator valve 14, as depicted. The nut portion 66 of the housing 62 is therefore adapted to be engaged by a tool such as a pneumatic ratchet to install the valve port 36 into the throat 11 of the regulator valve 14. The curtain portion 70 includes a plate 80 spaced from the body portion 68 of the housing 62 by a pair of legs 82. The plate 80 carries a secondary seat 71 including a rubber surface 73, for example. So configured, the curtain portion 70 defines a pair of windows 84 in the housing 60. The windows 84 allow for the flow of gas into the valve port 36 and through the regulator valve 14.

The cartridge 62 of the conventional valve port 36 depicted in FIG. 1A includes a hollow, generally cylindrical member defining a central orifice 88 therethrough. The cartridge 62 includes a first portion 62a and a second portion 62b. A diameter of the first portion 62a is slightly smaller than a diameter of the second portion 62b. Therefore, a shoulder 86 is disposed between the first and second portions 62a, 62b. The shoulder 86 abuts the step 76 of the housing 60 in the depicted position, thereby limiting the displacement of the cartridge 62 in the direction indicated by the arrow A in FIG. 1A.

Moreover, the first portion 62a of the cartridge 62 includes an outlet end 90 defining an externally chamfered surface 92 and a primary seat 94. The primary seat 94 is adapted to be sealingly engaged by the valve disc 28, as depicted, to stop the flow of gas through the regulator valve 14. The second portion 62b includes an inlet end 96 defining an internally chamfered surface 98 and a seating surface 95. The seating surface 95 is adapted to engage the rubber surface 73 of the secondary seat 71 upon the primary seat 94 failing to provide an adequate seal to close the valve port 36.

For example, during use, debris or some other type of foreign material may become lodged between the valve disc 28 and the primary seat 94 when the valve disc 28 attempts to seal against the primary seal 94. Thus, the primary seal fails to stop the flow of gas through the valve port 36 and the pressure downstream of the regulator 10, i.e., the outlet pressure, increases. This increase is sensed by the diaphragm 24 which further causes the valve disc 28 to be forced toward the valve port 36. This force eventually overcomes the force of the spring 64 in the valve port 36 and displaces the cartridge 62 relative to the housing 60 in a direction opposite the arrow A. Continued displacement causes the seating surface 95 on the second portion 62b of the cartridge 62 to engage the rubber surface 73 of the secondary seat 71 carried by the plate 80 of the curtain portion 70. So configured, the secondary seat 71 of the cartridge 62 seals the inlet end 96 and blocks the flow of gas from passing through the windows 84 in the housing 60, thereby preventing gas from flowing through the regulator valve 14. Moreover, the o-ring 83 seals any path for gas to penetrate the windows 84 and leak between the cartridge 62 and the housing 60 of the valve port 36. Once a downstream demand is placed back on the system however, the diaphragm 24 senses a decrease in outlet pressure and moves the valve disc 28 away from the valve port 36. The spring 64 biases the cartridge 62 back to the position depicted in FIG. 1A and any debris previously lodged between the valve disc 28 and the primary seat 94 likely releases and flows downstream of the regulator valve 14. Thus, the conventional regulator 10 and the conventional valve port 36 provide a secondary seal to back-up any failure or obstruction with the primary seal.

Additionally, as mentioned above, the conventional regulator 10 depicted in FIG. 1 further functions as a relief valve. Specifically, the control assembly 22 includes a relief spring 40 and a release valve 42. The diaphragm 24 includes an opening 44 through a central portion thereof and the piston 32 includes a sealing cup 38. The relief spring 40 is disposed between the piston 32 and the diaphragm 24 to bias the diaphragm 24 against the sealing cup 38 to close the opening 44, during normal operation. Upon the occurrence of a failure such as a break in the control arm 26, for example, the control assembly 22 is no longer in direct control of the valve disc 28 and the inlet flow will move the valve disc 28 into an extreme open position. This allows a maximum amount of gas to flow into the actuator 12. Thus, as the gas fills the actuator 12, pressure builds against the diaphragm 24 forcing the diaphragm 24 away from the sealing cup 38, thereby exposing the opening 44. The gas therefore flows through the opening 44 in the diaphragm 24 and toward the release valve 42. The release valve 42 includes a valve plug 46 and a release spring 54 biasing the valve plug 46 into a closed position, as depicted in FIG. 1. Upon the pressure within the actuator 12 and adjacent the release valve 42 reaching a predetermined threshold pressure, the valve plug 46 displaces upward against the bias of the release spring 54 and opens, thereby exhausting gas into the atmosphere and reducing the pressure in the regulator 10.

One consideration in selecting a regulator for use in a particular application includes maximizing flow capacity at the set outlet, or control, pressure. However, due to structural constraints, the conventional valve port 36 is limited as to how large of a diameter the orifice 88 may have. For example, one conventional embodiment of the valve port 36 may include an orifice 88 with a maximum diameter of seven-eighths of an inch, i.e., ⅞".

For example, the dimensions of the housing 60 of the valve port 36 are oftentimes prescribed by the amount of torque used to install the valve port 36 into the regulator valve 14. Specifically, as mentioned above, the valve port 36 may be installed with a pneumatic ratchet. If the sidewall of the body portion 68 of the housing 60 adjacent to the threads 72 is too thin, then the torque generated by the pneumatic ratchet may shear the housing 60. Accordingly, the thickness of the housing 60, which impacts the diameter of the orifice 88 in the cartridge 62, and therefore the maximum flow capacity, is limited based on the prescribed thickness of the sidewall of the housing 60. Additionally, as described above, the conventional port 36 requires the recess 78 in the housing 60 for accommodating the o-ring 83, which prevents leakage when utilizing the secondary seal. The position and geometry of the recess 78 may further compromise the structural integrity of the sidewall of the housing 60, and therefore, must be considered in designing the thickness of the housing 60.

Moreover, to maximize flow capacity of the valve port 36, the windows 84 must be positioned substantially within the flow of gas from the inlet 16. Thus, housing 60 of the valve port 36 is dimensioned such that the curtain portion 70 and the plate 80 carrying the secondary seat 71 extend well beyond the throat 11 of the regulator valve 14. So configured, the cartridge 62 must be suitably dimensioned to slide from the position depicted in FIG. 1A to a position where the seating surface 95 is in engagement with the secondary seat 71 upon the occurrence of a failure, as described above. Such dimensions add to the size and cost of the overall valve port 36.

SUMMARY

The present invention provides a fluid regulating device and/or a valve port for a fluid regulating device. The fluid regulating device generally comprises an actuator and a valve body. The actuator includes a moveable valve disc. The valve port is disposed within the valve body. The actuator displaces the valve disc relative to the valve port for controlling the flow of fluid through the valve body. The valve port includes a cartridge slidably disposed within a housing. The cartridge includes a primary seat for engagement with the valve disc to provide a primary seal to stop flow through the valve body when there is no demand on the system. Moreover, the housing includes a nose portion such that in the event there is an obstruction between the valve disc and the primary seat, the cartridge slides into the housing and the valve disc sealingly engages the nose portion on the housing to provide a back-up seal or secondary seal.

DETAILED DESCRIPTION

Figure 2:
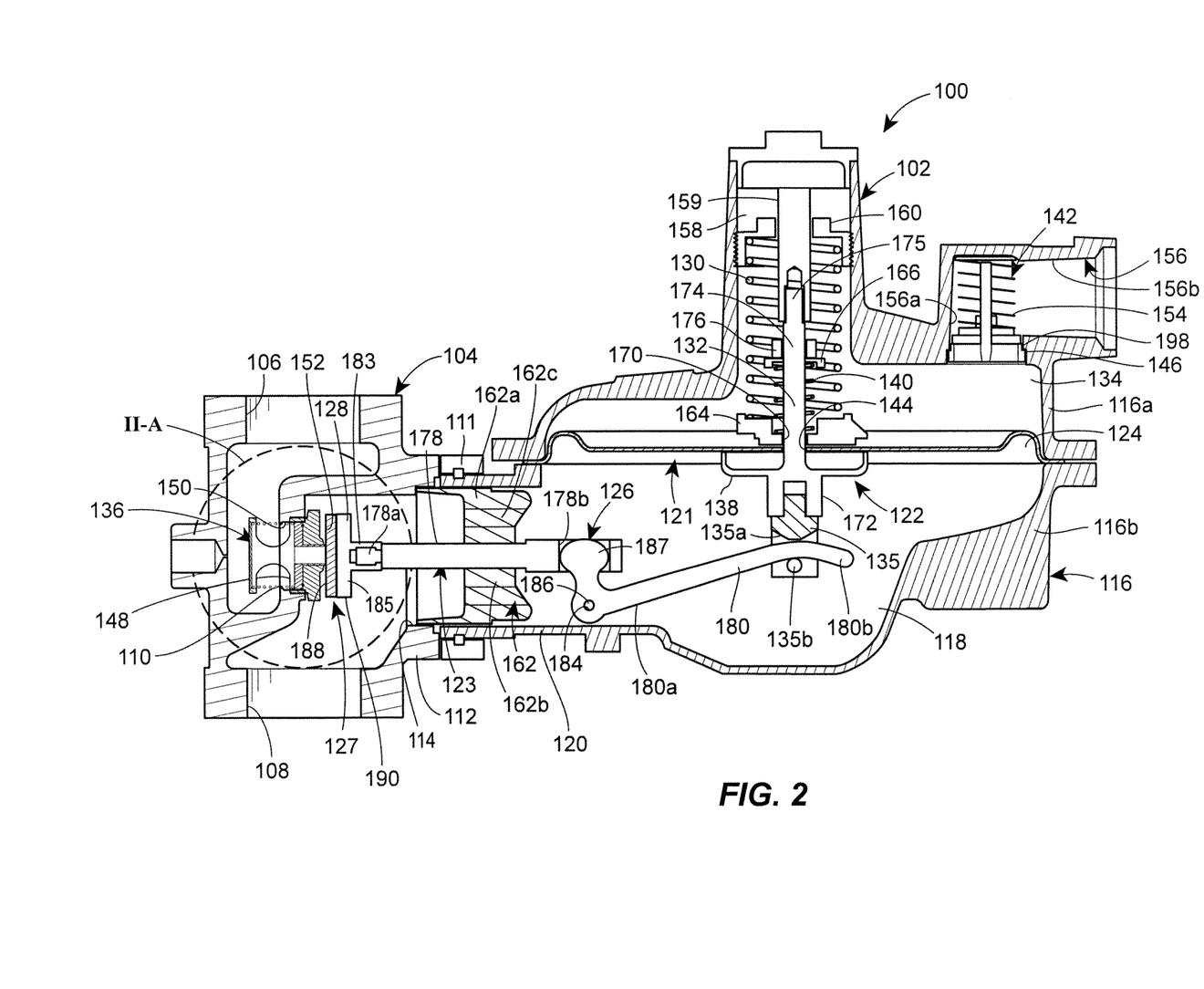
FIG. 2 is a side cross-sectional view of a regulator including a first embodiment of a valve port constructed in accordance with the principles of the present invention.

FIG. 2 depicts a gas regulator 100 constructed in accordance with one embodiment of the present invention. The gas regulator 100 generally includes an actuator 102 and a regulator valve 104. The regulator valve 104 includes an inlet 106 for receiving gas from a gas distribution system, for example, and an outlet 108 for delivering gas to a facility having one or more appliances, for example. The actuator 102 is coupled to the regulator valve 104 and includes a control assembly 122 having a control element 127. During a first or normal operational mode, the control assembly 122 senses the pressure at the outlet 108 of the regulator valve 104, i.e., the outlet pressure, and controls a position of the control element 127 such that the outlet pressure approximately equals a predetermined control pressure. Additionally, upon the occurrence of a failure in the system such as a breakage of one of the components of the control assembly 122, the regulator 100 performs a relief function that is generally similar to the relief function described above with reference to the relief valve 42 of the regulator 10 depicted in FIG. 1.

With continued reference to FIG. 2, the regulator valve 104 further defines a throat 110 and a valve mouth 112. The throat 110 is disposed between the inlet 106 and the outlet 108 accommodates a valve port 136. The valve mouth 112 defines an opening 114 disposed along an axis that is generally perpendicular to an axis of the inlet 106 and outlet 108 of the regulator valve 104. The valve port 136 defines a flow path 148 along an elongated orifice 288 (identified in FIG. 2A) that extends between an inlet end 150 and an outlet end 152. Gas must travel through the orifice 288 in the valve port 136 to travel between the inlet 106 and the outlet 108 of the regulator valve 104. The valve port 136 is removable from the regulator valve 104 such that it may be replaced with a different valve port having a different configuration to tailor operational and flow characteristics of the regulator valve 104 to a specific application.

The actuator 102 includes a housing 116 and the control assembly 122, as mentioned above. The housing 116 includes an upper housing component 116a and a lower housing component 116b secured together with a plurality of fasteners, for example. The lower housing component 116b defines a control cavity 118 and an actuator mouth 120. The actuator mouth 120 is connected to the valve mouth 112 of the regulator valve 104 to provide fluid communication between the actuator 102 and the regulator valve 104. In the disclosed embodiment, the regulator 100 includes a collar 111 securing the mouths 112, 120 together. The upper housing component 116a defines a relief cavity 134 and an exhaust port 156. The upper housing component 116a further defines a tower portion 158 for accommodating a portion of the control assembly 122, as will be described.

The control assembly 122 includes a diaphragm subassembly 121, a disc subassembly 123, and a release valve 142. The diaphragm subassembly 121 includes a diaphragm 124, a piston 132, a control spring 130, a relief spring 140, a combination spring seat 164, a relief spring seat 166, a control spring seat 160, and a piston guide 159.

More particularly, the diaphragm 124 includes a disc-shaped diaphragm defining an opening 144 through a central portion thereof. The diaphragm 124 is constructed of a flexible, substantially air-tight, material and its periphery is sealingly secured between the upper and lower housing components 116a, 116b of the housing 116. The diaphragm 124 therefore separates the relief cavity 134 from the control cavity 118.

The combination spring seat 164 is disposed on top of the diaphragm 124 and defines an opening 170 positioned concentric with the opening 144 in the diaphragm 124. As depicted in FIG. 2, the combination spring seat 164 supports the control spring 130 and the relief spring 140.

The piston 132 of the disclosed embodiment includes a generally elongated rod-shaped member having a sealing cup portion 138, a yoke 172, a threaded portion 174, and a guide portion 175. The sealing cup portion 138 is concaved and generally disc-shaped and extends circumferentially about a mid-portion of the piston 132, and is located just below the diaphragm 124. The yoke 172 includes a cavity adapted to accommodate a coupler 135 which connects to a portion of the disc subassembly 123 to enable attachment between the diaphragm subassembly 121 and the disc subassembly 123, as will be described.

The guide portion 175 and the threaded portion 174 of the piston 132 are disposed through the openings 144, 170 in the diaphragm 124 and the combination spring seat 164, respectively. The guide portion 175 of the piston 132 is slidably disposed in a cavity in the piston guide 159, which maintains the axial alignment of the piston 132 relative to the remainder of the control assembly 122. The relief spring 140, the relief spring seat 166, and a nut 176, are disposed on the threaded portion 174 of the piston 132. The nut 176 retains the relief spring 140 between the combination spring seat 164 and the relief spring seat 166. The control spring 130 is disposed on top of the combination spring seat 164, as mentioned, and within the tower portion 158 of the upper housing component 116a. The control spring seat 160 is threaded into the tower portion 158 and compresses the control spring 130 against the combination spring seat 164. In the disclosed embodiment, the control spring 130 and the relief spring 140 include compression coil springs. Accordingly, the control spring 130 is grounded against the upper housing component 116a and applies a downward force to the combination spring seat 164 and the diaphragm 124. The relief spring 140 is grounded against the combination spring seat 164 and applies an upward force to the relief spring seat 166, which in turn is applied to the piston 132. In the disclosed embodiment, the force generated by the control spring 130 is adjustable by adjusting the position of the control spring seat 160 in the tower portion 158, and therefore the control pressure of the regulator 100 is also adjustable.

The control spring 130 acts against the pressure in the control cavity 118, which is sensed by the diaphragm 124. As stated, this pressure is the same pressure as that which exists at the outlet 108 of the regulator valve 104. Accordingly, the force applied by the control spring 130 sets the outlet pressure to a desired, or control pressure for the regulator 100. The diaphragm subassembly 121 is operably coupled to the disc subassembly 123, as mentioned above, via the yoke portion 172 of the piston 132 and the coupler 135.

Specifically, the disc subassembly 123 includes a control aim 126 and a stem guide 162. The control arm 126 includes a stem 178, a lever 180, and the control element 127. The control element 127 of the disclosed embodiment includes a valve disc 128 with a seating surface 188. The valve disc 128 may be similar to the valve disc 28 described above with reference to FIG. 1, for example. The stem 178, lever 180, and valve disc 128 are constructed separately and assembled to form the control arm 126. Specifically, the stem 178 is a generally linear rod having a nose 178a and a recess 178b, which in the disclosed embodiment is generally rectangular. The lever 180 is a slightly curved rod and includes a fulcrum end 180a and a free end 180b. The fulcrum end 180a includes an aperture 184 receiving a pivot pin 186 carried by the lower housing component 116b. The fulcrum end 180a also includes a knuckle 187 having an elliptical cross-section and disposed within the recess 178b of the stem 178. The free end 180b is received between a top portion 135a and a pin 135b of the coupler 135 that is attached to the yoke 172 of the piston 132. Thus, the coupler 135 operably connects the disc subassembly 123 to the diaphragm subassembly 121.

The stem guide 162 includes a generally cylindrical outer portion 162a, a generally cylindrical inner portion 162b, and a plurality of radial webs 162c connecting the inner and outer portions 162b, 162a. The outer portion 162a of the stem guide 162 is sized and configured to fit within the mouths 112, 120 of the regulator valve 104 and lower housing component 116b, respectively. The inner portion 162b is sized and configured to slidably retain the stem portion 178 of the control arm 126. Thus, the stem guide 162 serves to maintain the alignment of the regulator valve 104, the actuator housing 116, and the control assembly 122, and more particularly, the stem 178 of the control arm 126 of the control assembly 122.

FIG. 2 depicts the regulator 100 in a normally operational closed position, where there is no demand placed on the system downstream of the regulator 100. Therefore, the seating surface 188 of the valve disc 128 sealingly engages the outlet end 152 of the valve port 136. So configured, gas does not flow through the valve port 136. This configuration is achieved because the outlet pressure, which corresponds to the pressure in the control cavity 118 of the housing 116 and sensed by the diaphragm 124, is greater than the force applied by the control spring 130. Accordingly, the outlet pressure forces the diaphragm 124 and the piston 132 into the closed position depicted.

However, in the event that an operating demand is placed on the gas distribution system, e.g., a user begins operating an appliance such as a furnace, a stove, etc., the appliance draws gas flow from the control cavity 118 of the regulator 100, thereby reducing the pressure that is sensed by the diaphragm 124. As the pressure sensed by the diaphragm 124 decreases, a force imbalance occurs between a control spring force and an outlet pressure force on the diaphragm 124 such that the control spring 130 expands and displaces the diaphragm 124 and piston 132 downward, relative to the housing 116. This causes the lever 180 to pivot in the clockwise direction about the pivot pin 186, which, in turn, rotates the knuckle 187 relative to the recess 178b in the stem 178. This moves the valve disc 128 away from the outlet end 152 of the valve port 136 to open the regulator valve 104. So configured, the gas distribution system is able to deliver gas to the downstream appliance through the regulator valve 104 at a control pressure that is set by the control spring 130. Additionally, the diaphragm subassembly 121 continues to sense the outlet pressure of the regulator valve 104. As long as the outlet pressure remains approximately equal to the control pressure, the control assembly 122 will balance the valve disc 128 in an open position away from the outlet end 152 of the valve port 136.

For example, if the outlet flow, i.e., the demand, increases, thereby decreasing the outlet pressure below the control pressure, the diaphragm senses the decreased outlet pressure and the spring 130 expands and moves the diaphragm 124 and piston 132 downward to further move the control element 127 away from the valve port 136 and further open the regulator valve 104. Alternatively, however, if the outlet flow, i.e., the demand, decreases, thereby increasing the outlet pressure above the control pressure set by the control spring 130, the diaphragm 124 senses the increased outlet pressure and moves upward against the bias of the control spring 130. Furthermore, in the event that the downstream demand completely stops, gas will continue to flow through the regulator valve 104 such that the downstream pressure sufficiently increases to move the valve disc 128 into engagement with the outlet end 152 of the valve port 136.

Figure 2A:
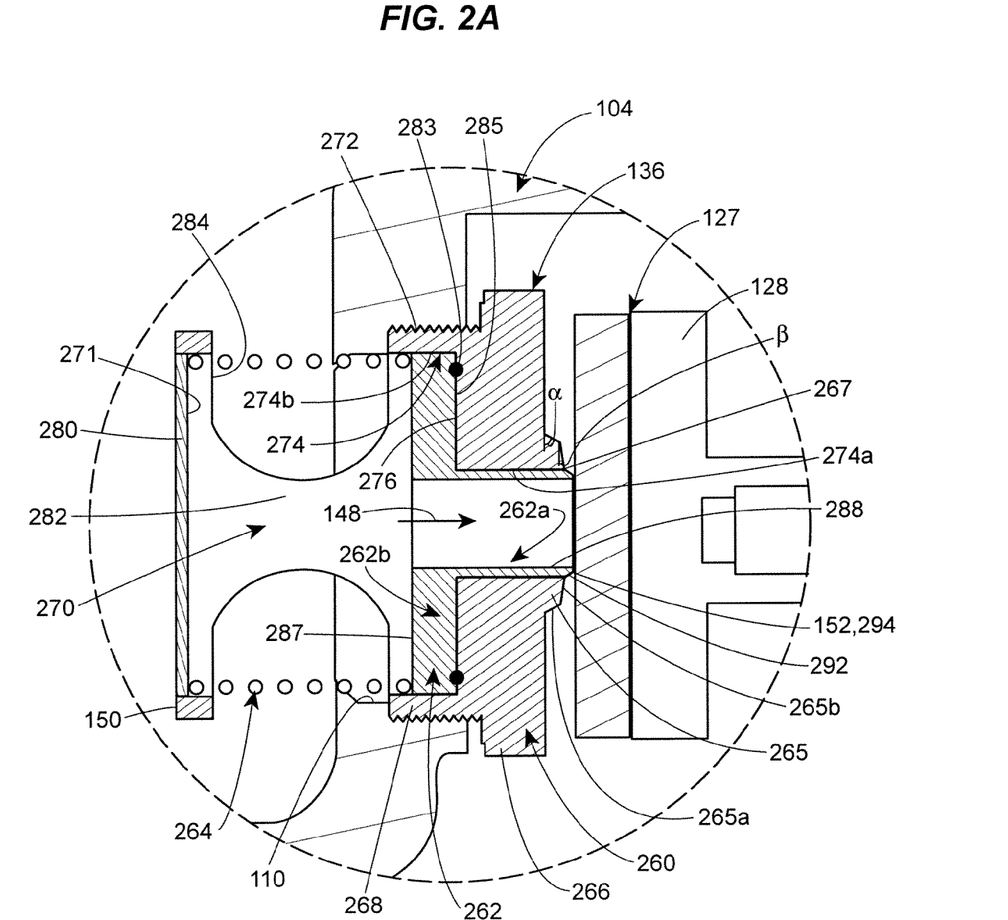
FIG. 2A is a side cross-sectional view of a regulator valve of the regulator of FIG. 2 illustrating the valve port providing a primary seal and taken from circle II-A of FIG. 2.
Figure 2B:
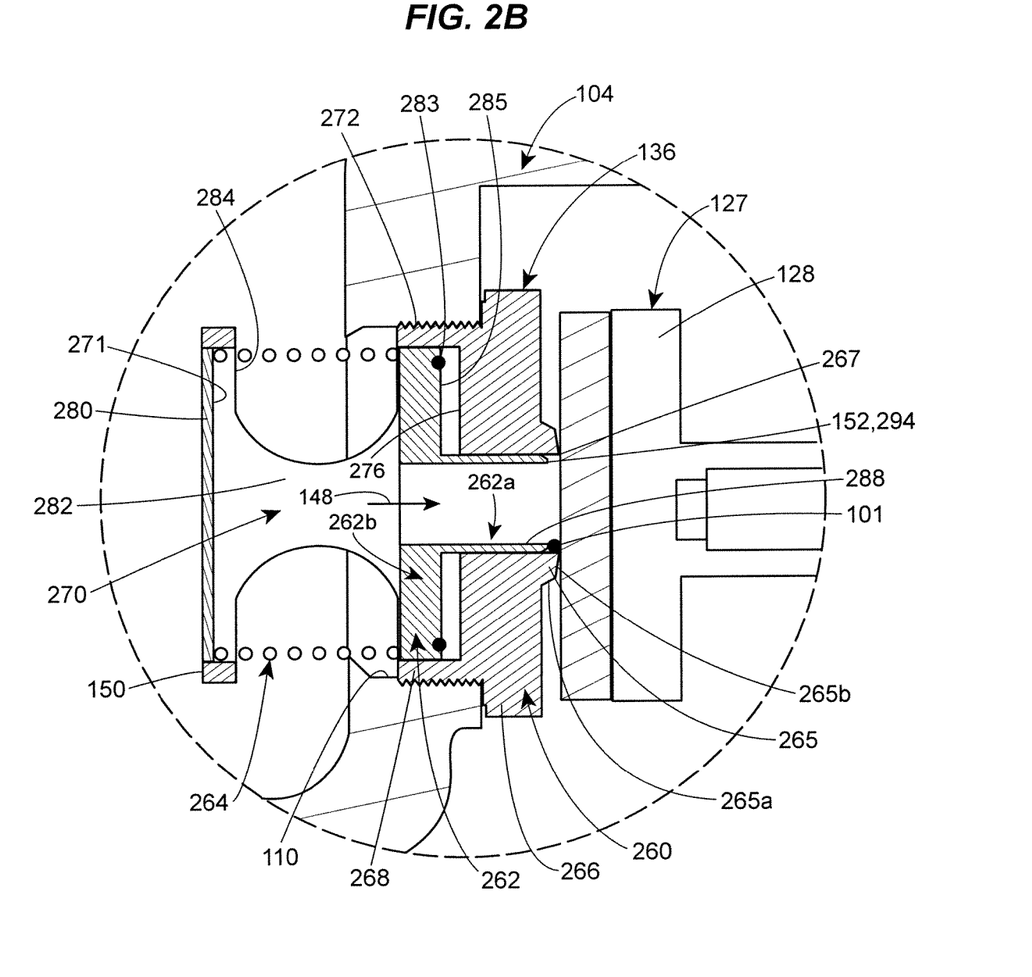
FIG. 2B is a side cross-sectional view of the regulator valve of FIG. 2A illustrating the valve port providing a secondary seal.

FIG. 2A depicts one embodiment of the valve port 136 constructed in accordance with the principles of the present invention. The valve port 136 generally includes a housing 260, a cartridge 262, and a spring 264. The cartridge 262 is slidably disposed within the housing 260 between a first position, which is depicted in FIG. 2A, and a second position, which is depicted in FIG. 2B. So configured, the valve port 136 is adapted for providing both a primary seal and a back-up, or secondary, seal, as will be described. The spring 264 biases the cartridge 262 into the first position depicted in FIG. 2A, which corresponds to a position for providing the primary seal.

The housing 260 includes a generally cylindrical housing having a nose 265, a hexagonal nut portion 266, a body portion 268, and a curtain portion 270. The nose 265, the nut portion 266, and the body portion 268 cooperatively, or in combination, define an internal cavity 274. The internal cavity 274 includes a first portion 274a and a second portion 274b. The diameter of the first portion 274a is smaller than the diameter of the second portion 274b. Thus, the body portion 268 includes a step surface 276 disposed between the first and second portions 274a, 274b.

The first portion 274a extends longitudinally from the nose 265 of the housing 260, through the nut portion 266, and terminates at the second portion 274b of the internal cavity 274. The second portion 274b extends longitudinally from the termination of the first portion 274a to the curtain portion 270 of the housing 260. The curtain portion 270 includes a plate 280 spaced from the body portion 268 of the housing 262 by a pair of legs 282. The plate 280 of the disclosed embodiment includes a solid circular plate that serves as a spring seat 271. So configured, the curtain portion 270 defines a pair of windows 284 in the housing 260 for allowing gas to flow into the valve port 136.

Additionally, the body portion 268 further includes a plurality of external threads 272 for being threadably coupled into the throat 110 of the regulator valve 104, as depicted. The nut portion 266 of the housing 262 is therefore adapted to be engaged by a tool such as a pneumatic ratchet to install the valve port 136 into the regulator valve 104.

The cartridge 262 of the valve port 136 disclosed in FIGS. 2, 2A, and 2B includes a conduit portion 262a and a flange portion 262b. The conduit portion 262a is generally cylindrical and defines an elongated central orifice 288 along the flow path 148. The central orifice 288 is adapted to accommodate the flow of fluid between the inlet 116 and the outlet 118 of the regulator valve 104. Moreover, the conduit portion 262a carries the outlet end 152 of the valve port 136 and an externally chamfered surface 292. The outlet end 152 serves as a primary seat 294, which is adapted to be sealingly engaged by the valve disc 128 to stop the flow of gas through the regulator valve 104, during a normally operational condition, as depicted in FIG. 2A, for example.

The flange portion 262b is a solid disc-shaped member extending circumferentially about the conduit portion 262a. The flange portion 262b includes a stop surface 285 and a spring seat surface 287, which is opposite the stop surface 285. The spring 264, which may include a compression coil spring, is retained between the spring seat surface 287 of the flange portion 262b of the cartridge 262 and the spring seat 271 of the curtain portion 270 of the housing 260. Thus, the spring 264 biases the cartridge 262 into the first position depicted in FIGS. 2 and 2A, which includes the outlet end 152 of the cartridge 262 extending outward beyond the nose 265 of the housing 260. In this position, the stop surface 285 abuts the step surface 276 of the housing 260 to limit the displacement of the cartridge 262 away from the spring 264.

FIGS. 2A and 2B depict one embodiment of the valve port 136 that may include a pneumatic seal such as an o-ring 283 positioned between the stop surface 285 of the cartridge 262 and the spring seat surface 276 of the housing 260. Although not necessary, such an o-ring 283 can provide an added seal between the cartridge 262 and the housing 260 when the cartridge 262 is the first position, as depicted in FIG. 2A. The o-ring 283 does not provide a sealing function when the cartridge 262 is in the second position, which includes the flange portion 262b of the cartridge 262 moved away and spaced from the step surface 276 of the housing 260 and the outlet end 152 of the cartridge 262 retracted into the nose 265 of the housing 260, as depicted in FIG. 2B.

As mentioned above, the housing 160 of the present embodiment of the valve port 136 includes a nose 265. The nose 265 generally includes a raised portion extending from the nut portion 266 of the housing 260 adjacent to the first portion 274a of the internal cavity 274 and the outlet end 152 of the cartridge 262. The nose 265 includes a first frustoconical 265a portion and a second frustoconical portion 265b disposed inside and concentric with the first frustoconical portion 265a. The first frustoconical portion 265a converges away from the nut portion 266 of the housing 260 at a first angle α. The second frustoconical portion 265b converges away from the nut portion 266 of the housing 260 at a second angle β. In the disclosed embodiment, the first angle α is greater than the second angle β. However, in an alternative embodiment, the first angle α may be equal to or even less than the second angle β. In any respect, the second frustoconical portion 265b, by virtue of extending further away from the nut portion 266 than the first frustoconical portion 265a, defines a secondary seat 267, which is adapted to be engaged by the valve disc 128 under certain failure conditions.

For example, during operation, debris or some other type of foreign material, which may be identified by reference numeral 101 in FIG. 2B, may become lodged between the valve disc 128 and the primary seat 294 when the regulator 100 attempts to seal the valve disc 128 against the primary seat 294. Thus, gas continues to flow through the valve port 136, thereby increasing the pressure downstream of the regulator 100, i.e., the outlet pressure. This increase is sensed by the diaphragm 124 which further causes the valve disc 128 to be forced toward the valve port 136. This force eventually overcomes the force of the spring 264 in the valve port 136 and displaces the cartridge 262 relative to the housing 260. Continued displacement causes the cartridge 262 to be forced into the second position, as depicted in FIG. 2B, such that outlet end 152 of the cartridge 262 is retracted into the nose 265 and the valve disc 128 engages the secondary seat 267. So configured, the valve disc 128 seals against the secondary seat 267 and prevents the flow of gas through the cartridge 262, and therefore through the regulator valve 104.

Thus, the regulator 100 and the valve port 136 of the embodiment depicted in FIGS. 2, 2A, and 2B advantageously provides the secondary seat 267 on the housing 260 downstream of the cartridge 262. This portion of the housing 260 is directly coupled to the regulator valve 104 and has more structural integrity than the conventional secondary seat 71, which is supported by the curtain portion 70 of the conventional valve port 36 described above with reference to FIGS. 1 and 1A.

Furthermore, the secondary seat 267 of the housing 260 of the valve port 136 eliminates any potential for a leakage path between the cartridge 262 and the housing 260 when the valve disc 128 engages the secondary seat 267. In contrast, when the cartridge 62 of the conventional valve port 36 depicted in FIGS. 1 and 1A sealingly engages the secondary valve seat 71, the o-ring 83 is required to prevent leakage between the cartridge 62 and the housing 60. Moreover, the o-ring 83 of the conventional valve port 36 requires the recess 78. As mentioned above, the recess 78 affects the structural integrity of the housing 60, particularly with respect to installation with a tool such as a pneumatic ratchet. Specifically, the inclusion of the o-ring 83 and therefore the recess 78 requires a sidewall thickness for the housing 60 that could otherwise be reduced. This thickened sidewall of the conventional housing 60 limits the maximum diameter of the orifice 88 and therefore the maximum flow capacity of the valve port 36. Accordingly, the potential range of flow capacities for the conventional valve port 36 is reduced.

Although, the valve port 136 of the present invention has been described as maybe including the o-ring 283, the valve port 136 neither requires such an o-ring nor a recess that compromises the strength of the housing 260. For example, the o-ring 283 is not positioned about an outer radial sidewall of the cartridge 262, but rather, it is positioned between the stop surface 285 of the flange portion 262b and the step surface 276 of the housing 260. So positioned, the o-ring 283 does not affect the thickness of the sidewall of the housing 260 in the manner that the recess 78 and o-ring 83 of the conventional valve port 36 affect the thickness of the conventional housing 60.

Furthermore, the o-ring 283 only provides a pneumatic seal between the cartridge 262 and the housing 260 when the cartridge 262 is in the normal operating position depicted in FIGS. 2 and 2A, for example. When the valve disc 128 moves the cartridge 262 into the housing 260 and engages the secondary seat 267, as depicted in FIG. 2B, the o-ring 283 provides no sealing function. In fact, as mentioned above, an alternative embodiment of the valve port 136 may not require such a pneumatic seal.

Figure 3:
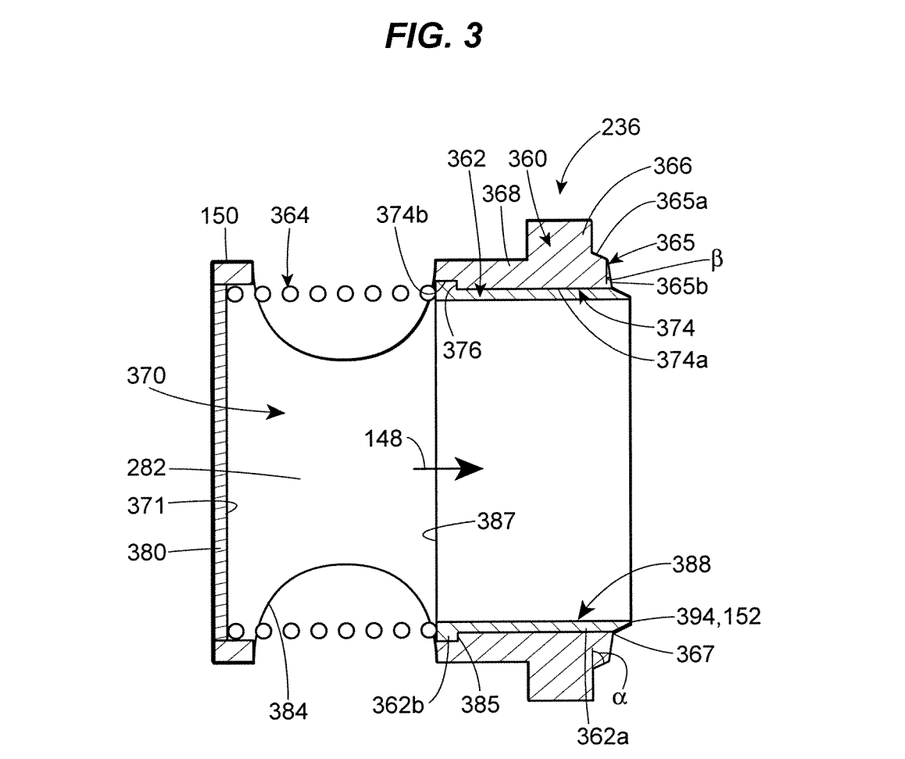
FIG. 3 is a side cross-sectional view of a second embodiment of a valve port constructed in accordance with the principles of the present invention.

Therefore, because the valve port 136 of the present embodiment of the present invention does not require a pneumatic seal similar to the o-ring 83 of the conventional valve port 36, the valve port 136 provides for a greater range of flow capacities, and more particularly, a greater maximum flow capacity. For example, FIG. 3 depicts a second embodiment of a valve port 236 constructed in accordance with the principles of the present invention. The valve port 236 is similar to the valve port 136 described above with reference to FIGS. 2A and 2B.

Specifically, the valve port 236 depicted in FIG. 3 includes a housing 360, a cartridge 362, and a spring 364. The cartridge 362 is slidably disposed within the housing 360 similar to the cartridge 262 discussed above with reference to FIGS. 2A and 2B. So configured, the valve port 236 is adapted for providing both a primary seal and a back-up, or secondary, seal. The spring 364 biases the cartridge 362 into the position depicted in FIG. 3, which corresponds to a position for providing the primary seal.

The housing 360 includes a generally cylindrical housing having a nose 365, a hexagonal nut portion 366, a body portion 368, and a curtain portion 370. The nose 365, the nut portion 366, and the body portion 368 cooperatively, or in combination, define an internal cavity 374. The internal cavity 374 includes a first portion 374a and a second portion 374b. The diameter of the first portion 374a is only slightly smaller than the diameter of the second portion 374b in the embodiment of the valve port 236 depicted in FIG. 3. Thus, the body portion 368 includes a step surface 376 disposed between the first and second portions 374a, 374b.

The first portion 374a extends longitudinally from the nose 365 of the housing 360, through the nut portion 366, and terminates at the second portion 374b of the internal cavity 374. The second portion 374b extends longitudinally from the termination of the first portion 374a to the curtain portion 370 of the housing 360. The curtain portion 370 includes a plate 380 spaced from the body portion 368 of the housing 362 by a pair of legs 382. The plate 380 of the disclosed embodiment includes a solid circular plate that serves as a spring seat 371. So configured, the curtain portion 370 defines a pair of windows 384 in the housing 360 for allowing gas to flow into the valve port 236.

Additionally, the body portion 368 further includes a plurality of external threads 372 for being threadably coupled into the throat 110 of the regulator valve 104, as depicted in FIG. 2, for example. The nut portion 366 of the housing 362 is therefore adapted to be engaged by a tool such as a pneumatic ratchet to install the valve port 236 into the regulator valve 104.

The cartridge 362 of the valve port 236 disclosed in FIG. 3 includes a conduit portion 362a and a flange portion 362b. The conduit portion 362a is generally cylindrical and defines an elongated central orifice 388 along the flow path 148. The central orifice 388 is adapted to accommodate the flow of fluid between the inlet 116 and the outlet 118 of the regulator valve 104. Moreover, the conduit portion 362a carries the outlet end 152 of the valve port 236, as described above with reference to FIG. 2, and an externally chamfered surface 392. The outlet end 152 serves as a primary seat 394, which is adapted to be sealingly engaged by the valve disc 128 to stop the flow of gas through the regulator valve 104.

The flange portion 362b is a solid disc-shaped member extending circumferentially about the flow portion 362a. The flange portion 362b includes a stop surface 385 and a spring seat surface 387, which is opposite the stop surface 385. The spring 364, which may include a compression coil spring, is retained between the spring seat surface 387 of the flange portion 362b of the cartridge 362 and the spring seat 371 of the curtain portion 370 of the housing 360. Thus, the spring 364 biases the cartridge 362 into the position depicted in FIG. 3. The stop surface 385 abuts the step surface 376 of the housing 360 to limit the displacement of the cartridge 362 away from the spring 364.

FIG. 3 depicts an embodiment of the valve port 236 that does not include a pneumatic seal disposed between the cartridge 362 and the housing 360. Such a pneumatic seal is not necessary, as discussed above with reference to the previous embodiment of the valve port 136 depicted in FIGS. 2, 2A and 2B.

As mentioned above, the housing 360 of the present embodiment of the valve port 236 includes a nose 365. The nose 365 generally includes a raised portion extending from the nut portion 366 of the housing 360 adjacent to the first portion 374a of the internal cavity 374 and the outlet end 152 of the valve port 236. The nose 365 includes a first frustoconical 365a portion and a second frustoconical portion 365b disposed inside and concentric with the first frustoconical portion 365a. The first frustoconical portion 365a converges away from the nut portion 366 of the housing 360 at a first angle α. The second frustoconical portion 365b converges away from the nut portion 366 of the housing 360 at a second angle β. In the disclosed embodiment, the first angle α is greater than the second angle β. However, in an alternative embodiment, the first angle α may be equal to or even less than the second angle β. In any respect, the second frustoconical portion 365b, by virtue of extending further away from the nut portion 366 than the first frustoconical portion 365a, defines a secondary seat 367, which is adapted to be engaged by the valve disc 128 under certain failure conditions, such as debris becoming lodged between the valve disc 128 and the primary seat 394, similar to that described above with reference to the previous embodiment of the valve port 136 depicted in FIGS. 2, 2A, and 2B.

Accordingly, the diameter of the orifice 388 of the present embodiment of the valve port 236 is larger than the diameter of the orifice 288 of the valve port 136 described above with reference to FIGS. 2, 2A, and 2B. Moreover, the diameter of the orifice 388 of the present embodiment of the valve port 236 is advantageously larger than the diameter of the orifice 88 of the conventional valve port 36 described above with reference to FIGS. 1 and 1A. So configured, the valve port 236 of the embodiment depicted in FIG. 3 has a flow capacity substantially greater than a flow capacity of the previous embodiment of the valve port 136, as well as the conventional valve port 36.

The increased diameter of the orifice 388 of the valve port 236 depicted in FIG. 3 translates into an increased diameter of the conduit portion 362a of the cartridge 362, as well as the nose 365 of the housing 360. Nevertheless, the cartridge 362 and housing 360 of the embodiment depicted in FIG. 3 operate in a similar manner to the cartridge 262 and housing 260 of the valve port 136 described with reference to FIGS. 2, 2A, and 2B.

In one embodiment, the orifice 388 of the embodiment of the valve port 236 depicted in FIG. 3 may have a maximum diameter of approximately one and three-eighths inches, i.e., 1⅜". This is made possible by the elimination of the need for a recess for accommodating an o-ring between the outer radial surface of the cartridge 362 and the housing 360, which correlates to a decrease in the overall thickness of the sidewall of the housing 360.

Thus, the present invention advantageously provides for a versatile valve port having increased flow capacity and increased structural integrity while performing a secondary sealing function. While the various embodiments of the valve port 136, 236 constructed in accordance with the present invention have thus far been described as including a housing 260, 360 with a nose 265, 365 comprising first and second frustoconical portions 265a, 265b, 365a, 365b, as well as a cartridge 262, 362 having an outlet end 152 with a single externally chamfered surface 292, 392 adjacent a primary seat 294, 394, alternative embodiments may include different geometrical configurations.

Figure 4:
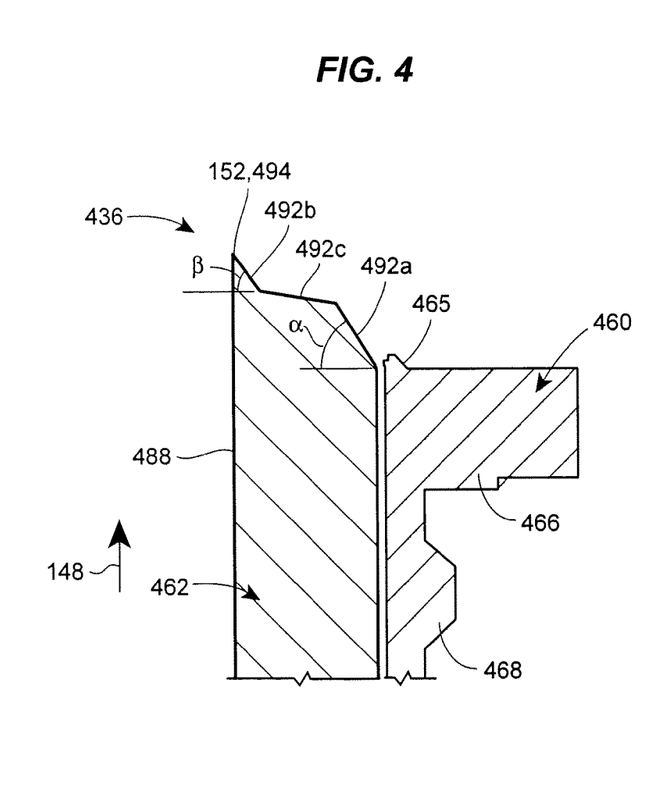
FIG. 4 is a partial side cross-sectional view of a third embodiment of a valve port constructed in accordance with the principles of the present invention.

For example, FIG. 4 depicts a partial cross-section of one alternative embodiment of a valve port 436 constructed in accordance with the principles of the present invention and including a housing 460 and a cartridge 462. The housing 460 and cartridge 462 are adapted to be arranged in operation with a spring such as springs 264, 364 described above with reference to FIGS. 2-3.

The housing 460 includes a nose 465, a nut portion 466, and a body portion 468. The housing 460 may also include a curtain portion similar to the curtain portions 270, 370 described above with reference to FIGS. 2-3. The nose 465 of the housing 460 generally includes a bead extending circumferentially around the outlet end 152 of the valve port 436.

The nose 465 may include a rubber bead, a steel bead, or a bead constructed of generally any material. The nose 465 may even include an o-ring attached to the nut portion 466 of the housing 460.

FIG. 4 depicts only a conduit portion 462a of the cartridge 462. The conduit portion 462a is generally cylindrical and defines an elongated central orifice 488 along the flow path 148. Moreover, the conduit portion 462a carries the outlet end 152 of the valve port 436. The outlet end 152 serves as a primary seat 494, which is adapted to be sealingly engaged by the valve disc 128 to stop the flow of gas through the regulator valve 104. The specific embodiment of the outlet end 152 of the cartridge 462 includes first and second externally chamfered surfaces 492a, 492b separated by a planar surface 492c. The first externally chamfered surface 492a is disposed at an angle α relative to the planar surface 492c. The second externally chamfered surface 492b is disposed at an angle β relative to the planar surface 492c. In the disclosed embodiment, the angle α is greater than the angle β. However, in alternative embodiments, the angle α may be less than or equal to the angle β.

Figure 5:
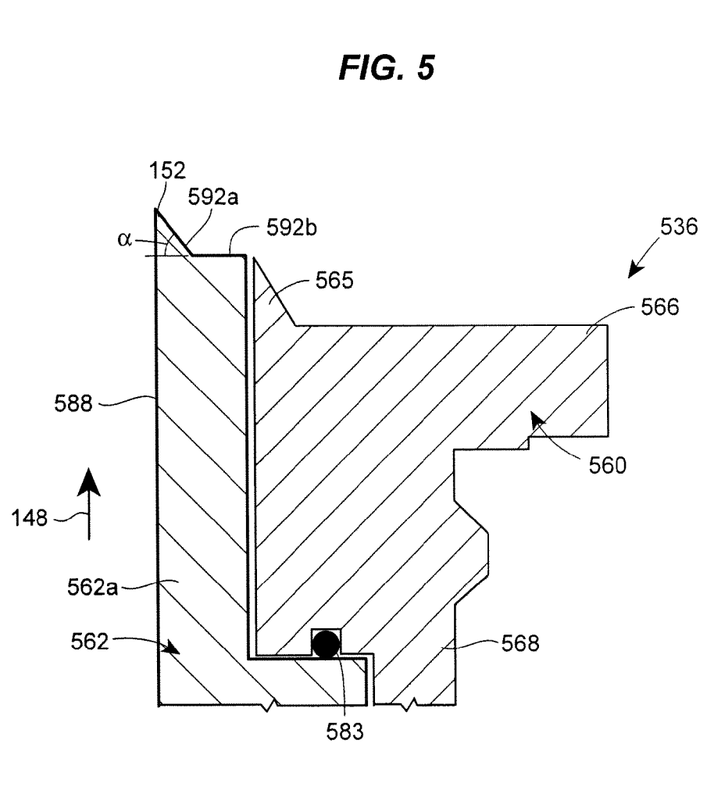
FIG. 5 is a partial side cross-sectional view of a fourth embodiment of a valve port constructed in accordance with the principles of the present invention.

FIG. 5 depicts yet another embodiment of a valve port 536 constructed in accordance with the present invention. Similar to the valve ports 136, 236, 436 described above, the valve port 536 includes a housing 560 and a cartridge 562. The housing 560 and cartridge 562 are adapted to be arranged in operation with a spring such as springs 264, 364 described above with reference to FIGS. 2-3.

The housing 560 includes a nose 565, a nut portion 566, and a body portion 568. The housing 560 may also include a curtain portion similar to the curtain portions 270, 370 described above with reference to FIGS. 2-3. The nose 565 of the housing 560 generally includes a single frustoconical protrusion extending circumferentially around the outlet end 152 of the valve port 536.

FIG. 5 depicts only a conduit portion 562a of the cartridge 562. The conduit portion 562a is generally cylindrical and defines an elongated central orifice 588 along the flow path 148. Moreover, the conduit portion 562a carries the outlet end 152 of the valve port 536. The outlet end 152 serves as a primary seat 594, which is adapted to be sealingly engaged by the valve disc 128 to stop the flow of gas through the regulator valve 104. The specific embodiment of the outlet end 152 of the cartridge 562 includes an externally chamfered surface 592a and a planar surface 592b. The externally chamfered surface 592a is disposed at an angle α relative to the planar surface 592b. Additionally, as depicted in FIG. 5, the valve port 536 may include a pneumatic seal such as an o-ring 583 disposed between the cartridge 562 and the housing 560. However, as described above with reference to the valve port 136 described with reference to FIGS. 2, 2A, and 2B, such a pneumatic seal is no required to seal a leakage path when the valve port 536 provides a secondary seal with a valve disc 128 because the valve disc 128 actually seals against the nose 565 of the housing 560 upstream of the cartridge 562.

Therefore, regardless of the specific geometry of the various components of the valve ports 136, 236, 436, and 536 depicted in FIGS. 2-5, the valve ports 136, 236, 436, and 536 function in a substantially similar manner to advantageously provide a primary seal at an outlet end 152 of the valve ports 136, 236, 436, and 536 and a secondary seal against a nose 165, 265, 465, and 565 of the respective housings 260, 360, 460, and 560. At least one advantage of this configuration includes a more compact housing dimensions from the top of the noses 265, 364, 465, 565 to the bottom of the curtain portions 270, 370, 470, and 570, relative to the conventional valve port 36 described above with reference to FIGS. 1 and 1A. This reduced dimension helps reduce material, weight, packaging, and cost of the overall valve port 136, 236, 436, 536.

Moreover, the regulator 100 described herein is merely one example of a fluid control device incorporating the principles of the present invention. Other fluid control devices such as control valves may also benefit from the structures and/or advantages of the present invention.

What is claimed is:

1. A fluid regulating device comprising:
a valve body defining an inlet, an outlet, and a throat disposed between the inlet and the outlet;
a valve disc disposed in the valve body and adapted to be displaced relative to the valve body between a primary seating position and a secondary seating position;
a valve port disposed within the throat of the valve body, the valve port comprising a housing and a cartridge, the housing fixed to the valve body and defining a cavity with a first portion and a second portion, the first portion having a diameter that is smaller than a diameter of the second portion, the cartridge defining an inlet end, and outlet end, and an elongated orifice extending between the inlet end and the outlet end for allowing a fluid to pass through the valve port, the cartridge disposed in the cavity of the housing and adapted for displacement between a first position extending out of the housing, and a second position retracted into the housing;
a primary seat carried by the cartridge, the primary seat sealingly engaged by the valve disc when the valve disc is in the primary seating position and the cartridge is in the first position, thereby stopping the flow of fluid through the valve port; and
a secondary seat carried by the housing at a location proximate to the outlet end of the cartridge and having a diameter that is the same as the diameter of the first portion of the cavity of the housing, the secondary seat comprising an annular protrusion disposed immediately adjacent to and in contact with the outlet end of the cartridge, wherein the annular protrusion of the housing comprises a frustoconical nose portion, and the secondary seat being sealingly engaged by the valve disc when the valve disc is in the secondary seating position and the cartridge is in the second position, thereby stopping the flow of fluid through the valve port.

2. The device of claim 1, wherein the outlet end of the cartridge extends beyond the annular protrusion of the housing when the cartridge is in the first position, and the outlet end of the cartridge is retracted into the housing when the cartridge is in the second position.

3. The device of claim 1, wherein the primary and secondary seats are each disposed at a location opposite the inlet end of the cartridge.

4. The device of claim 1, wherein the housing of the valve port is removably threaded into the throat of the valve body.

5. The device of claim 1, wherein the cavity of the housing defines a step surface and the cartridge defines a stop surface that is parallel to the step surface and adapted to engage the stop surface when the cartridge is in the first position.

6. The device of claim 5, wherein the pneumatic seal comprises an o-ring disposed between the step surface of the cavity of the housing and the stop surface of the flange portion of the cartridge.

7. The device of claim 1, further comprising an actuator connected to the valve body, the actuator comprising a diaphragm operably connected to the valve disc and adapted displace the valve disc between the primary and secondary seating positions in response to changes in pressure at the outlet of the valve body.

8. A fluid regulating device comprising:
a valve body defining an inlet, an outlet, and a throat disposed between the inlet and the outlet;
a valve disc disposed in the valve body and adapted to be displaced relative to the valve body between a primary seating position and a secondary seating position;
a valve port disposed within the throat of the valve body, the valve port comprising a housing and a cartridge slidably disposed within the housing between a first position extending out of the housing and a second position retracted into the housing, the cartridge defining an inlet end, an outlet end, and an elongated orifice extending between the inlet and outlet ends for allowing fluid to flow along a flow path through the valve port, the housing fixed to the valve body and defining a cavity with a first portion and a second portion, the first portion having a diameter that is smaller than a diameter of the second portion;
a primary seat carried by the valve port and adapted to be sealingly engaged by the valve disc when the valve disc is in the primary seating position and the cartridge is in the first position, thereby stopping the flow of fluid through the valve port;
a secondary seat carried by the valve port and having a diameter that is the same as the diameter of the first portion of the cavity of the housing, the secondary seat comprising an annular protrusion comprising a frustoconical nose portion and being disposed immediately adjacent to and in contact with the outlet end of the cartridge and being sealingly engaged by the valve disc when the valve disc is in the secondary seating position and the cartridge is in the second position, thereby stopping the flow of fluid through the valve port,
the primary and secondary seats disposed at a location that is downstream of the inlet end of the cartridge along the flow path;
a pneumatic seal disposed within the cavity of the housing between the housing and the cartridge, the pneumatic seal providing a seal between the housing and the cartridge when the cartridge is in the first position, and the pneumatic seal not providing a seal between the between the housing and the cartridge when the cartridge is in the second position; and
a coil spring disposed between the housing and the cartridge and biasing the cartridge into the first position.

9. The device of claim 8, wherein the outlet end of the cartridge carries the primary seat and the housing carries the secondary seat.

10. The device of claim 8, wherein the housing of the valve port is removably threaded into the throat of the valve body.

11. The device of claim 8, wherein the cartridge is disposed in the cavity, the cavity defining a step surface and the cartridge defining a stop surface that is parallel to the step surface and adapted to engage the stop surface when the cartridge is in the first position.

12. The device of claim 10, wherein the pneumatic seal comprises an o-ring disposed between the step surface of the cavity and the stop surface of the cartridge.

13. The device of claim 8, further comprising an actuator connected to the valve body, the actuator comprising a diaphragm operably connected to the valve disc and adapted displace the valve disc between the primary and secondary seating positions in response to changes in pressure at the outlet of the valve body.

14. A valve port adapted for use with a fluid regulating device comprising a valve body and an actuator including a valve disc disposed in the valve body and adapted for displacement relative to the valve body for controlling the flow of fluid through the valve body, the valve port comprising:
a housing comprising a cavity and an annular protrusion, the cavity having a first portion and a second portion, the first portion having a diameter that is smaller than a diameter of the second portion;
a cartridge disposed within the housing and comprising an inlet end, an outlet end disposed immediately adjacent to and in contact with the annular protrusion of the housing, wherein the annular protrusion of the housing comprises a frustoconical nose portion, and an orifice extending between the inlet and outlet ends for allowing a fluid to flow through the valve port, the cartridge adapted for displacement relative to the housing between a first position where the outlet end extends beyond the housing at a location proximate to the annular protrusion, and a second position where the outlet end is retracted into the housing;
a spring disposed between the housing and the inlet end of the cartridge and biasing the cartridge into the first position;
a primary seat carried by the outlet end of the cartridge and adapted to be sealingly engaged by the valve disc of the actuator when the cartridge is in the first position to stop the flow of fluid through the valve port;
a secondary seat carried by the annular protrusion of the housing at a location proximate to the outlet end of the cartridge and having a diameter that is the same as the diameter of the first portion of the cavity of the housing, the secondary seat adapted to be sealing engaged by the valve disc of the actuator when the cartridge is in the second position to stop the flow of fluid through the valve port; and
a pneumatic seal disposed within the cavity of the housing between the housing and the cartridge, the pneumatic seal providing a seal between the housing and the cartridge when the cartridge is in the first position, and the pneumatic seal not providing a seal between the between the housing and the cartridge when the cartridge is in the second position.

15. The device of claim 14, wherein the cavity of the housing defines a step surface and the cartridge defines a stop surface that is parallel to the step surface and adapted to engage the stop surface when the cartridge is in the first position.

16. The device of claim 15, wherein the pneumatic seal comprises an o-ring disposed between the step surface of the cavity of the housing and the stop surface of the flange portion of the cartridge.

17. The device of claim 1, wherein the housing comprises a spring seat engaged by the coil spring and at least one window disposed proximate to the spring seat for enabling fluid to flow through the valve port.

18. The device of claim 8, wherein the housing comprises a spring seat engaged by the coil spring and at least one window disposed proximate to the spring seat for enabling fluid to flow through the valve port.

19. The device of claim 14, wherein the housing comprises a spring seat engaged by the spring and at least one window disposed proximate to the spring seat for enabling fluid to flow through the valve port.

20. The fluid regulating device of claim 1, further comprising a pneumatic seal disposed within the cavity of the housing between the housing and the cartridge, the pneumatic seal providing a seal between the housing and the cartridge when the cartridge is in the first position, and the pneumatic seal not providing a seal between the housing and the cartridge when the cartridge is in the second position.

21. The fluid regulating device of claim 20, wherein the pneumatic seal has a diameter that is larger than the diameter of the first portion of the cavity of the housing and smaller than the diameter of the second portion of the cavity of the housing such that the pneumatic seal provides a seal against an annular surface of the housing that extends between the first and second portions of the cavity when the cartridge is in the first position.

22. The fluid regulating device of claim 20, further comprising a coil spring disposed between the housing and the cartridge and biasing the cartridge into the first position.

* * * * *

UNITED STATES PATENT AND TRADEMARK OFFICE
CERTIFICATE OF CORRECTION

| | | |
|---|---|---|
| PATENT NO. | : 8,500,092 B2 | Page 1 of 1 |
| APPLICATION NO. | : 12/105792 | |
| DATED | : August 6, 2013 | |
| INVENTOR(S) | : Erik M. Quijano | |

It is certified that error appears in the above-identified patent and that said Letters Patent is hereby corrected as shown below:

<u>In the Specification:</u>

At Column 2, line 38, "housing 62" should be -- housing 60 --.

At Column 2, line 42, "housing 62" should be -- housing 60 --.

At Column 6, lines 60-61, "control aim 126" should be -- control arm 126 --.

At Column 12, line 38, "1 3/8"." should be -- 1 and 3/8". --.

Signed and Sealed this
Twenty-first Day of April, 2015

Michelle K. Lee
*Director of the United States Patent and Trademark Office*